United States Patent
Tsai

(10) Patent No.: US 7,975,177 B2
(45) Date of Patent: Jul. 5, 2011

(54) SYSTEM AND METHOD FOR TESTING NETWORK PERFORMANCE

(75) Inventor: Ying-Chuan Tsai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 150 days.

(21) Appl. No.: 12/512,047

(22) Filed: Jul. 30, 2009

(65) Prior Publication Data

US 2010/0332913 A1    Dec. 30, 2010

(30) Foreign Application Priority Data

Jun. 24, 2009   (CN) .......................... 2009 1 0303583

(51) Int. Cl.
*G06F 11/00* (2006.01)

(52) U.S. Cl. ............... 714/25; 714/4.1; 714/16; 714/18; 714/40; 714/43; 702/118

(58) Field of Classification Search .................. 702/118; 714/4, 16, 18, 25, 40, 43

See application file for complete search history.

(56) References Cited

U.S. PATENT DOCUMENTS

| | | | |
|---|---|---|---|
| 6,321,347 B1 * | 11/2001 | Beeker et al. | 714/28 |
| 6,810,364 B2 * | 10/2004 | Conan et al. | 702/188 |
| 6,823,479 B1 * | 11/2004 | McElhaney et al. | 714/43 |
| 7,093,169 B2 * | 8/2006 | Merriam | 714/47.2 |
| 7,114,106 B2 * | 9/2006 | Klotz et al. | 714/712 |
| 7,222,255 B1 * | 5/2007 | Claessens et al. | 714/4.12 |
| 7,840,841 B2 * | 11/2010 | Huang et al. | 714/25 |
| 2002/0059545 A1 * | 5/2002 | Nakashima et al. | 714/43 |
| 2004/0049714 A1 * | 3/2004 | Marples et al. | 714/43 |
| 2005/0044443 A1 * | 2/2005 | Magnaghi et al. | 714/4 |
| 2005/0223362 A1 * | 10/2005 | Whitlock et al. | 717/126 |
| 2005/0235263 A1 * | 10/2005 | Bundy et al. | 717/124 |
| 2005/0268165 A1 * | 12/2005 | Betts et al. | 714/18 |

* cited by examiner

*Primary Examiner* — Robert Beausoliel
*Assistant Examiner* — Joshua P Lottich
(74) *Attorney, Agent, or Firm* — Zhigang Ma

(57) ABSTRACT

A system can test network performance of an electronic device via transmitting a testing file with a first designated name to a number of computers connected to the electronic device, obtaining comparison files from the number of computers after running the testing file, and replacing the names of the comparison files with standard names. The network performance of the electronic device can be confirmed via contents of the comparison files.

8 Claims, 4 Drawing Sheets

SYSTEM AND METHOD FOR TESTING NETWORK PERFORMANCE

BACKGROUND

1. Technical Field

The present disclosure relates to systems and methods, and particularly to a system and a method for testing network performance.

2. Description of Related Art

Nowadays, network performance of a server can be tested via setting a testing file in every computer connected to the server. The computer runs contents of the testing file and generates comparison files after running the contents of the testing file. The network performance of the server can be confirmed via the comparison files. However, the comparison files have to be exported, which is inconvenient.

DETAILED DESCRIPTION

Figure 1:
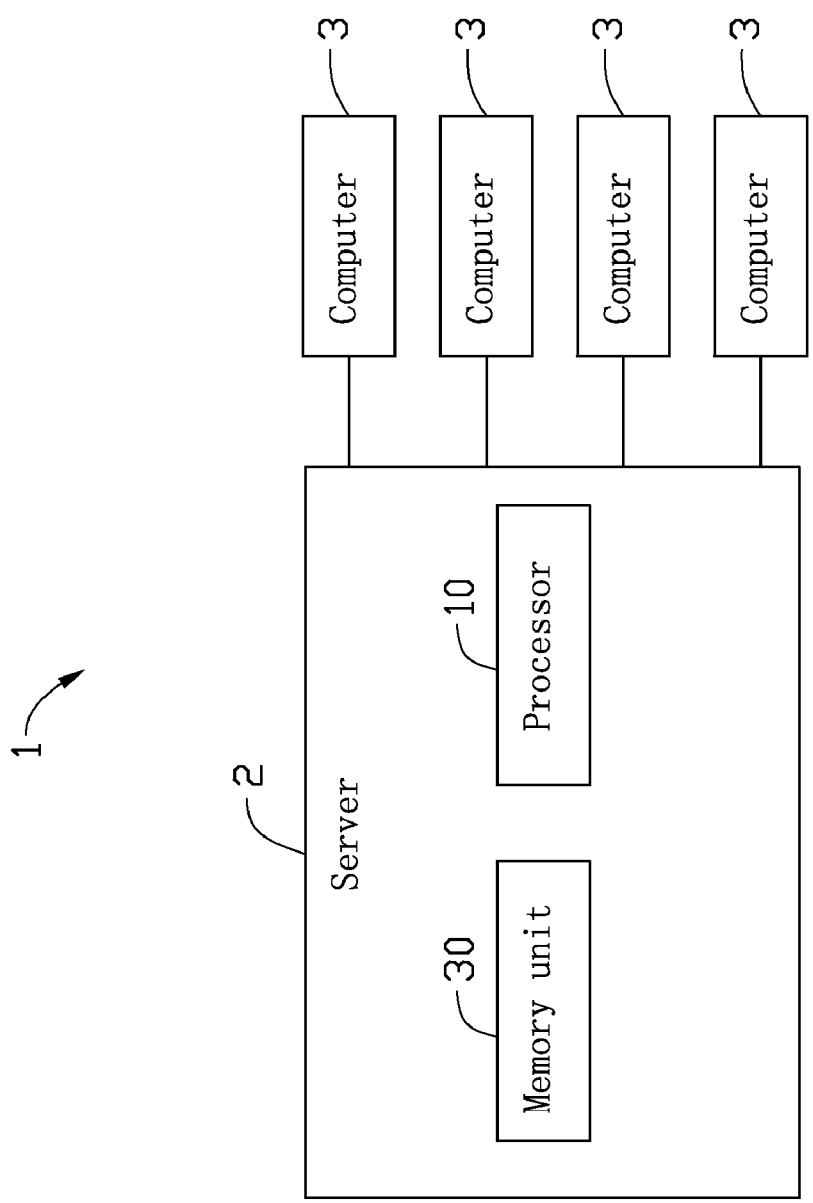
FIG. 1 is a block diagram of one embodiment of a system for testing network performance, the system including a memory unit.

Referring to FIG. 1, an exemplary embodiment of a system 1 used to test network performance of an electronic device, such as a server 2 is illustrated. The system 1 includes a memory unit 30, a processor 10, and a plurality of computers 3 connected to the server 2 via network. In the embodiment, there are four computers 3.

The memory unit 30 is received in the server 2, and may be a random access memory (RAM) for temporary storage of information and/or a read only memory (ROM) for permanent storage of information. The processor 10 is received in the server 2, and connected to the memory unit 30.

Figure 2:
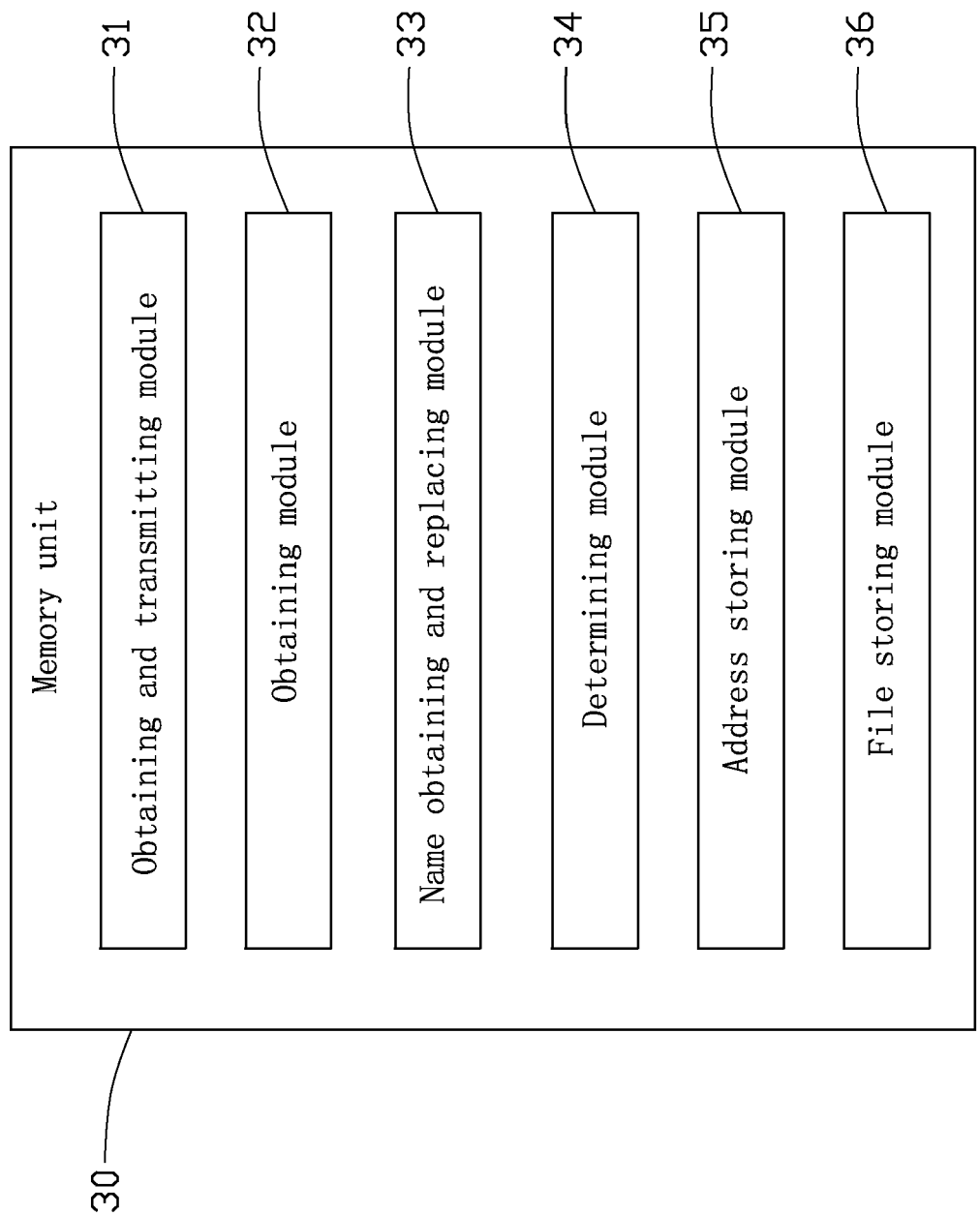
FIG. 2 is a block diagram of one embodiment of the memory unit of FIG. 1.

Referring to FIG. 2, the memory unit 30 includes an obtaining and transmitting module 31, an obtaining module 32, a name obtaining and replacing module 33, a determining module 34, an address storing module 35, and a file storing module 36. The obtaining and transmitting module 31, the obtaining module 32, the name obtaining and replacing module 33, the determining module 34, the address storing module 35, and the file storing module 36 may include one or more computerized instructions executable by the processor 10.

The processor 10 stores four internet protocol (IP) addresses corresponding to the four computers 3 in the address storing module 35. The file storing module 36 stores a testing file with a first designated name, such as test mss.mpx, and four standard names which meet needs of customers, corresponding to the four IP addresses. The standard names will be used to rename the comparison files generated by the computers 3 in a later stage of the testing.

The obtaining and transmitting module 31 is operable to obtain the testing file with the first designated name from the file storing module 36 and obtain each IP address from the address storing module 35, and transmit the testing file to the corresponding computers 3 according to the obtained IP addresses.

Each computer 3 coupled to the server 2 via the network runs the testing file after receiving it, and generates a comparison file with a second designated name corresponding to the first designated name.

The obtaining module 32 is operable to obtaining the comparison files from all of the computers 3.

The name obtaining and replacing module 33 is operable to obtain the corresponding standard names from the file storing module 36 according to the IP addresses corresponding to the computers 3, and replace the second designated name of each comparison file with a corresponding obtained standard name. Therefore, customers can recognize which one of the computers that each comparison file comes from and confirm the network performance of the server 2.

The determining module 34 is operable to determine whether all of the computers 3 corresponding to the IP addresses receive the testing file, and determine whether the obtaining module 32 obtains the comparison files from all of the computers 3 which received the testing file. If at least one of the computers 3 fails to receive the testing file, the determining module 34 transmits each IP address of the at least one of the computers 3 to the obtaining and transmitting module 31. The obtaining and transmitting module 31 transmits the testing file again to the at least one of the computers 3 corresponding to the received IP addresses. If the obtaining module 32 fails to obtain the comparison file from at least one of the computers 3 which received the testing file, the determining module 34 transmits the IP addresses corresponding to the at least one of the computers 3 to the obtaining module 32. The obtaining module 32 obtains the comparison file from at least one of the computers 3 according to the received IP addresses. If the determining module 34 determines that the obtaining module 32 obtains the comparison files from all of the computers 3 which received the testing file, the system 1 stops transmitting and obtaining files.

Figure 3A:
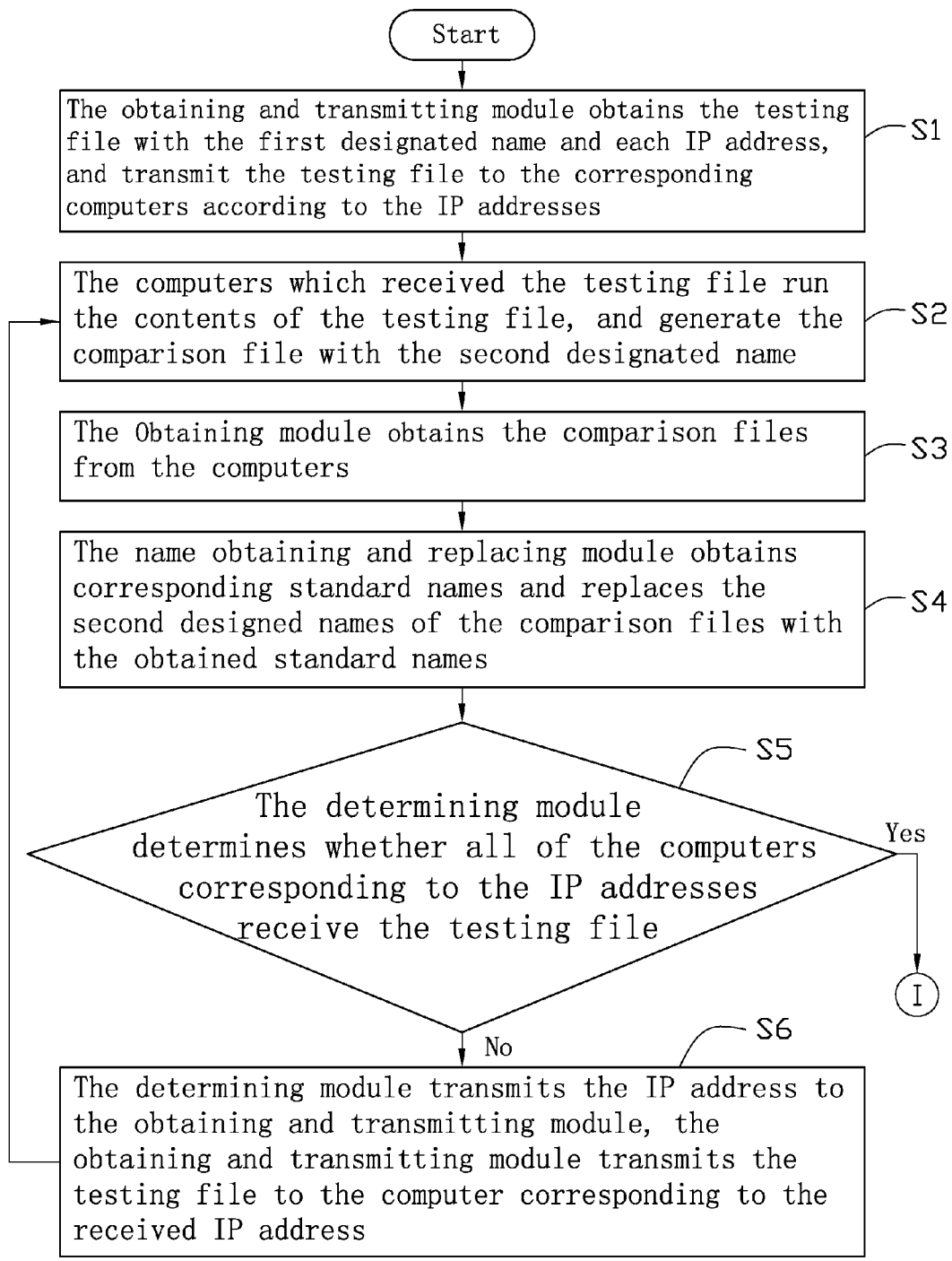
FIG. 3 is a flowchart illustrating one embodiment of a method for testing network performance.
Figure 3B:
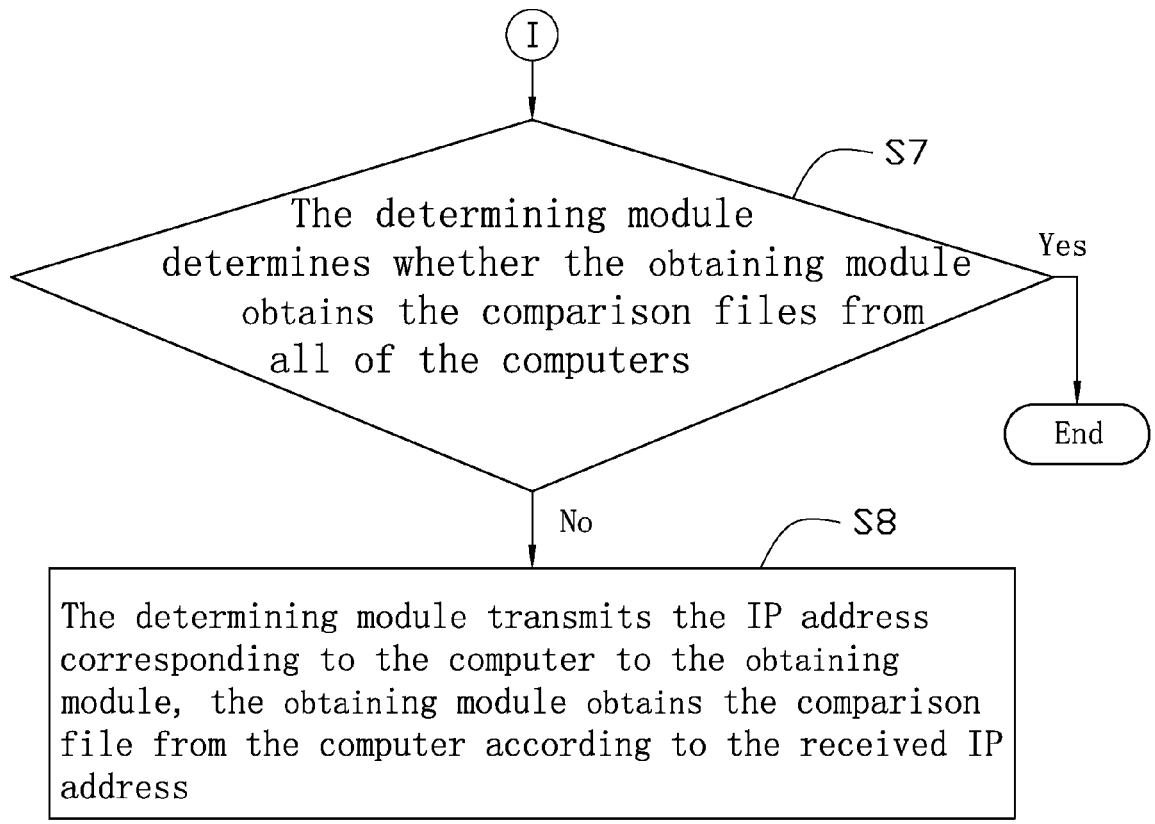

Referring to FIG. 3, an exemplary embodiment of a method for testing network performance includes the following steps.

In step S1, the obtaining and transmitting module 31 obtains the testing file with the first designated name from the file storing module 36 and obtains the IP address of each computer 3 from the address storing module 35, and transmits the testing file to the corresponding computers 3 according to the IP addresses.

In step S2, each computer 3 which receives the testing file runs the testing file, and then generates the comparison file with the second designated name.

In step S3, the obtaining module 32 obtains the comparison files from the computers 3.

In step S4, the name obtaining and replacing module 33 obtains corresponding standard names from the file storing module 36 according to the IP addresses corresponding to the computers 3, and replaces the second designated names of the comparison files with the obtained standard names.

In step S5, the determining module 34 determines whether all of the computers 3 corresponding to the IP addresses received the testing file. If at least one of the computers 3 fails to receive the testing file, the procedure goes to step 6. If all of the computers 3 received the testing file, the procedure goes to step 7.

In step S6, the determining module 34 transmits the IP address corresponding to the at least one of the computers 3 which failed to receive the testing file to the obtaining and transmitting module 31. The obtaining and transmitting module 31 transmits the testing file again to the at least one of the computers 3 corresponding to the received IP address, then the procedure goes to step 2.

In step S7, the determining module 34 determines whether the obtaining module 32 obtains the comparison files from all of the computers 3. If the determining module 34 determines that the obtaining module 32 obtains the comparison files from all of the computers 3 which received the testing file, the procedure ends. If the obtaining module 32 fails to obtain the comparison file from at least one of the computers 3 which received the testing file, the procedure goes to step 8.

In step S8, the determining module 34 transmits the IP address corresponding to the at least one of the computers 3 from which the obtaining module 32 fails to obtain a comparison file to the obtaining module 32. The obtaining module 32 obtains the comparison file from the at least one of the computers 3 according to the received IP address, then the procedure goes to step 4.

The network performance of the server 2 can be confirmed according to the contents of the comparison files. If the contents of the comparison meet the customer's definition, the network performance of the server 2 is normal. If the contents of the comparison fail to meet the customer's definition, the network performance of the server 2 is abnormal.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A system for testing network performance of an electronic device, the system comprising:
   a plurality of computers connected to the electronic device;
   a processor in the electronic device; and
   a memory unit included in the electronic device and connected to the processor, and storing one or more computerized instructions being executed by the processor, wherein the memory unit comprises:
      an address storing module to store a plurality of internet protocol (IP) addresses corresponding to the plurality of computers;
      a file storing module to store a testing file with a first designated name and a plurality of standard names corresponding to the plurality of IP addresses;
      an obtaining and transmitting module to obtain the testing file with the first designated name from the file storing module and obtain each IP address from the address storing module, and transmit the testing file to the corresponding computers according to the obtained IP addresses;
      an obtaining module to obtain a comparison file with a second designated name generated by each of the plurality of computers after running the testing file; and
      a name obtaining and replacing module to obtain corresponding standard names from the file storing module according to the IP addresses corresponding to the plurality of computers, and replace the second designated name of each comparison file with the corresponding obtained standard name, wherein the network performance of the electronic device can be confirmed via the contents of the comparison files.

2. The system of claim 1, wherein the memory unit further comprises a determining module, the determining module is operable to determine whether all of the plurality of computers corresponding to the IP addresses receive the testing file, and determine whether the obtaining module obtains the comparison files from all of the plurality of computers which received the testing file, if the determining module determines all of the computers receive the testing file and the obtaining module obtains the comparison files from all of the plurality of computers, the system stops transmitting and obtaining files.

3. The system of claim 2, wherein if a computer fails to receive the testing file, the determining module transmits the IP address corresponding to the computer failing to receive the testing file to the obtaining and transmitting module, and the obtaining and transmitting module transmits the testing file again to the computer corresponding to the received IP address.

4. The system of claim 2, wherein if the obtaining module fails to obtain the comparison file from a computer which received the testing file, the determining module transmits the IP address corresponding to the computer to the obtaining module, the obtaining module obtains the comparison file from the computer according to the received IP address.

5. A method for testing network performance of an electronic device connected to a plurality of computers, the method comprising:
   a: obtaining a testing file with a first designated name and a plurality of internet protocol (IP) addresses corresponding to each of the plurality of computers, and transmitting the testing file to the plurality of computers according to the IP addresses;
   b: running the testing file, and generating a comparison file with a second designated name by each of the plurality of computers;
   c: obtaining the comparison file from each of the plurality of computers; and
   d: obtaining corresponding standard names according to the IP addresses corresponding to the plurality of computers, and replacing the second designated names of the comparison files with the obtained standard names, wherein the network performance of the electronic device can be confirmed via contents of the comparison files.

6. The method of claim 5, further comprising:
   e: determining whether all of the plurality of computers corresponding to the IP addresses receive the testing file, if all of the computers receive the testing file, the procedure goes to step f; and
   f: determining whether the comparison files from all of the computers which received the testing file are obtained, if the comparison files from all of the computers are obtained, the procedure ends.

7. The method of claim 6, wherein the IP address corresponding to the computer failing to receive the testing file is transmitted if a computer fails to receive the testing file, the testing file is transmitted again to the computer corresponding to the received IP address, the procedure goes to step b.

8. The method of claim 6, wherein the corresponding IP address is transmitted to an obtaining module if the comparison file from a computer which received the testing file fails to be read by the obtaining module, the comparison file from the computer according to the received IP address is then obtained, the procedure goes to step d.

* * * * *